United States Patent Office 3,423,225
Patented Jan. 21, 1969

3,423,225
TEMPORARY PROTECTIVE FILMS FROM POLYOLEFIN DISPERSIONS
Charles H. Coney, and Willie E. Draper, Kingsport, Tenn., assignors to Eastman Kodak Company, Rochester, N.Y., a corporation of New Jersey
No Drawing. Filed July 15, 1965, Ser. No. 472,351
U.S. Cl. 117—6         2 Claims
Int. Cl. B44d 1/09

ABSTRACT OF THE DISCLOSURE

Dispersion of low-molecular weight polyolefin in a hydrocarbon or a hydrocarbon-alcohol system and a surfactant. The dispersion is useful as a temporary continuous coating adapted to be applied by means of spraying and being characterized in that it is easily removable with a mild detergent solution but yet will withstand weather elements such as rain, snow and the like.

---

This invention relates to coatings for the temporary protection of surfaces such as new automotive finishes. More particularly, it relates to readily removable automobile lacquer protective coatings.

Automotive specifications include the use of wax emulsions or substances similar to waxes in hydrocarbons as a temporary preservative for lacquer coatings and chromed parts of finished vehicles. Current compositions on the market produce a white powdery coating, much of which is easily rubbed off. However, the remaining film must be removed by a mixture of detergent, water, and a solvent such as kerosene. Even with this composition, considerable rubbing is required to remove the film.

After extensive investigation we have found a dispersion which when applied from a solvent system forms a thin continuous film easily removable with a 5 percent solution of detergent in water.

One object of this invention is to provide a temporary protective coating, that is, a coating which is easy to apply over a permanent coating or other surface by a spray application. Another object is to provide a coating that will withstand the weather elements, rain, snow, wind and the like, yet is easily removable with a mild detergent solution without damage to the surface or finish being protected. Further objects will be apparent hereinafter.

In its broader aspects our invention involves a dispersion of a low-molecular-weight polyolefin in a suitable hydrocarbon or hydrocarbon-alcohol solvent system. The dispersion contains 0.1 to 20 percent by weight low-molecular-weight polyolefin wax, 72 to 99.89 percent by weight hydrocarbon or hydrocarbon-alcohol solvent and 0.01 to 8 percent by weight surfactant. Preferred ranges of the foregoing constituents in percent by weight are 2 to 5 polyolefin wax, 93 to 97.5 solvent and 0.5 to 2 surfactant. It is thought unnecessary here to describe further suitable low-molecular-weight polyolefin waxes as these are available on the market, e.g., as Epolene polyethylene waxes, and as described in U.S. Patent 3,106,485 of our co-workers Guillet and Coover. The dispersion may be sprayed by pressure or electrostatic methods to produce a continuous temporary coating (not an emulsion). A hydrocarbon is not needed for removal. This composition is so formulated to facilitate easy removal of the protective coating with a mild detergent solution such as 5 percent Tide in water.

The following examples are illustrative of our invention.

Example I

The initial formulation consisted of 10 parts of a low-molecular-weight polyethylene [1:1 blend of a polyethylene wax having a molecular weight of 3700 (Epolene C–12) and a polyethylene wax having a molecular weight of 1500 (Epolene N–11)], 2 parts of sorbitan trioleate (Span 85) and 90 parts of heptane. The polyethylene in heptane was heated at 160° F. with agitation until uniform dispersion (parts in parts by weight) was obtained. This formulation can be sprayed without difficulty to form a continuous film. The coating dried rapidly by solvent evaporation and did not cause swelling of butyrate-acrylic or enamel automotive finishes. The temporary protective coating was rainproof after a 5-minute drying period. It was easily removed with naphtha.

Example II

In this example, 4.15 parts of a polyethylene having an average molecular weight of about 10,000 (Epolene C–11) were dispersed in 19 parts naphtha by heating to 190 to 200° F. The solution was cooled and precipitated with 62.7 parts heptane before adding 0.85 part sorbitan trioleate (Span 85) and 13.3 parts of a 1:1 blend of methanol and isopropanol. The inclusion of the alcohol assisted in application of this formulation by spraying electrostatically.

This formulation showed less than three percent (3%) separation of the solvent and the finely precipitated polyolefin. A protective film applied from this formulation was uniform. The resistance of the coating to water and water spotting was excellent. The coating was removable using a 5 percent detergent solution.

Example III

Example II was repeated using 3.53 parts of a polyethylene having an average molecular weight of about 1,500 dissolved in 62.7 parts heptane by heating to about 150° F. The dispersion was in turn cooled and precipitated with 19 parts naphtha before adding 1.45 parts sorbitan trioleate (Span 85), 0.02 part of a dispersing agent (Aerosol OT), and 13.3 parts of a 1:1 blend of methanol and isopropanol respectively. The properties of this formulation were found to be substantially the same as those of the formulation of Example II, except that this formulation produced a film which tended to be somewhat smoother when applied and to exhibit a somewhat higher degree of separation between solvents and precipitated polyolefin.

Example IV

Example II was repeated by melting 4.15 parts of a lower molecular weight (7,000) polyolefin (Epolene C–10) before adding 95 parts Stoddard solvent and 0.85 part sorbitan trioleate (Span 85) with continued heating until a uniform dispersion was obtained. Preparation from this point on was varied as follows:

(a) The dispersion was allowed to stand with no agitation;

(b) The dispersion was allowed to cool slowly with occasional agitation;

(c) The dispersion was allowed to cool slowly with continued agitation;

(d) The dispersion was cooled rapidly with vigorous agitation.

Method (b) produced the most homogeneous and stable dispersions of the described methods. The dispersion produced by Method (d) showed some separation and settling after three hours.

The use of the higher boiling solvent in this example resulted in a higher flash point (122° F.-T.D.C.) of the dispersion.

Films applied from these dispersions generally require a somewhat longer dry period (ten minutes at room temperature) to produce the optimum water repellency. Other properties are similar to the properties described in Examples I–III except that rubbing is required to remove the film with a 5 percent detergent solution.

Example V

Dispersions containing 4.15 parts polyethylene, 0.85 part sorbitan trioleate (Span 85), 82 parts Stoddard solvent and 13 parts of a 1:1 blend of menthanol:isopropanol were prepared as described in Example IV.

The dispersions prepared by Method (b) produced the somewhat superior stability while Methods (a) and (d) produced somewhat more settling. Otherwise, the properties of these dispersions were substantially the same as described in Example IV.

Example VI

The procedure described in Example IV was again repeated. This time the formulation was the same as given in Example V except that 0.16 part COCO amine was added. Again Method (b) tended to produce the most stable dispersions with respect to settling.

Protective films applied from this dispersion have all the desired properties described in the previous examples. In addition, the protective films are very easily removed with a 5 percent detergent solution (Tide in water). This is a preferred formulation according to our invention with respect to formulation removability.

The following examples show other formulations for polyethylene wax dispersions according to our invention. These dispersions were prepared substantially in accordance with the procedures of Examples I–VI hereinabove for similar formulations. Numbers in each instance refer to parts by weight.

Example VII

| | |
|---|---|
| Polyethylene wax, M.W. 3770 (Epolene C–12) | 5 |
| Polyethylene wax, M.W. 1500 (Epolene N–11) | 5 |
| Sorbitan trioleate (Span 85) | 2 |
| Heptane | 88 |

Example VIII

| | |
|---|---|
| Polyethylene wax, M.W. 10,000 (Epolene C–11) | 4.15 |
| Sorbitan trioleate (Span 85) | 0.85 |
| Heptane | 62.70 |
| Naphtha | 19.00 |
| Isopropanol | 6.65 |
| Methanol | 6.65 |

Example IX

| | |
|---|---|
| Polyethylene wax, M.W. 10,000 (Epolene C–11) | 4.15 |
| Sorbitan Trioleate (Span 85) | 0.85 |
| Heptane | 76.00 |
| Naphtha | 19.00 |

Example X

| | |
|---|---|
| Polyethylene wax, M.W. 7,000 (Epolene C–10) | 4.15 |
| Sorbitan trioleate (Span 85) | 0.85 |
| COCO amine (Armeen C) | 0.16 |
| Stoddard solvent (Amsco) | 94.84 |

Example XI

| | |
|---|---|
| Polyethylene wax, M.W. 7,000 (Epolene C–10) | 4.15 |
| Sorbitan trioleate (Span 85) | 0.85 |
| COCO Amine (Armeen C) | 0.24 |
| Naphtha | 5.00 |
| BRONOCO 211 (medium boiling aliphatic hydrocarbon) | 89.76 |

Example XII

| | |
|---|---|
| Polyethylene wax, M.W. 7,000 (Epolene C–10) | 4.15 |
| Sorbitan trioleate (Span 85) | 0.85 |
| COCO amine (Armeen C) | 0.16 |
| Methanol | 6.50 |
| Isopropanol | 6.50 |
| Stoddard solvent (Amsco) | 81.84 |

Example XIII

| | |
|---|---|
| Polyethylene wax, M.W. 7,000 (Epolene C–10) | 4.15 |
| Sorbitan trioleate (Span 85) | 0.85 |
| COCO amine (Armeen C) | 0.48 |
| Methanol | 6.50 |
| Isopropanol | 6.50 |
| Stoddard solvent (Amsco) | 81.52 |

For best performance the hot dispersions of our invention should be cooled rapidly with continuous agitation. For best removability, the formulation should contain a surfactant, e.g., sorbitan trioleate or a blend of sorbitan trioleate with COCO amine.

The polyolefins used in the preparation of our dispersions may vary in molecular weight from 1,500 to 10,000. We have achieved best performance with a molecular weight between 6,000 and 8,000.

Hydrocarbons other than those cited in the above examples may be used provided they are non-swelling so as not to damage the finish they are designed to protect.

From the preceding description and examples it should be apparent that we have provided a polyethylene wax dispersion suitable for temporary protection of new automobiles. The dispersion may be applied as a coating to the finished car to protect it while it is in transit from manufacture to dealer. The dealer may easily remove the temporary protective barrier with a detergent solution. Meanwhile it will have served him well due to its stability, smoothness and evenness of film formation, water repellency and protection of the under surface. The inclusion of a COCO amine (Armeen C) helps improve ease of removal of film with detergent.

Although the invention has been described in considerable detail with particular reference to certain preferred embodiments thereof, variations and modifications can be effected within the spirit and scope of the invention as described hereinabove, and as defined in the appended claims.

We claim:

1. Process for production of a detergent removable temporary protective coating composition which comprises dispersing 2 to 5 percent by weight polyethylene wax of a molecular weight of 6,000 to 8,000 first in 15 to 25 percent by weight naphtha at a temperature of about 190° to 200° F., cooling the resulting dispersion and precipitating it with heptane, dispersing said precipitated wax in 93 to 97.5 percent by weight of a hydrocarbon or hydrocarbon-alcohol solvent and adding 0.5 to 2 percent by weight of a sorbitan trioleate-primary amine of coconut oil surfactant and 10 to 15 percent by weight of a 1:1 blend of methanol and isopropanol and spraying the resulting dispersion on a smooth surface to obtain a substantially water-proof film spread substantially uniformly over the surface on which sprayed, thereby enabling ready removal by application of a detergent.

2. The process of claim 1 wherein the dispersion is cooled slowly with occasional agitation before spraying.

(References on following page)

References Cited

UNITED STATES PATENTS

| | | | |
|---|---|---|---|
| 2,986,471 | 5/1961 | Rudd | 106—2 |
| 2,395,025 | 2/1946 | Wassell | 106—271 |
| 2,851,369 | 9/1958 | Geen | 106—271 |
| 3,000,753 | 9/1961 | Rockland | 106—271 |
| 3,086,871 | 4/1963 | Sheldahl | 106—271 |
| 2,949,374 | 8/1960 | Kendall | 106—271 |
| 2,949,373 | 8/1960 | Kendall | 106—271 |
| 3,071,479 | 1/1963 | Fulenwider | 106—271 |
| 3,125,453 | 3/1964 | Simonds | 106—10 |

FOREIGN PATENTS 660,205  10/1951  Great Britain.

OTHER REFERENCES

Epolene, 1963 (Eastman), 3 pages, copy in S.L.

MORRIS LIEBMAN, *Primary Examiner.*

H. H. FLETCHER, *Assistant Examiner.*

106—10, 271; 117—161; 260—33.4, 33.6